US011149519B2

(12) United States Patent
De Stefano et al.

(10) Patent No.: US 11,149,519 B2
(45) Date of Patent: Oct. 19, 2021

(54) SMART FILTRATE FOR STRENGTHENING FORMATIONS

(71) Applicant: M-I L.L.C., Houston, TX (US)

(72) Inventors: Guido De Stefano, Houston, TX (US); James Friedheim, Spring, TX (US); Steven Young, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/300,799

(22) PCT Filed: Mar. 30, 2015

(86) PCT No.: PCT/US2015/023274
§ 371 (c)(1),
(2) Date: Sep. 30, 2016

(87) PCT Pub. No.: WO2015/153419
PCT Pub. Date: Oct. 8, 2015

(65) Prior Publication Data
US 2017/0015890 A1    Jan. 19, 2017

Related U.S. Application Data

(60) Provisional application No. 61/972,871, filed on Mar. 31, 2014, provisional application No. 61/972,755, filed on Mar. 31, 2014, provisional application No. 61/972,805, filed on Mar. 31, 2014.

(51) Int. Cl.
| | |
|---|---|
| E21B 33/13 | (2006.01) |
| E21B 33/138 | (2006.01) |
| C09K 8/32 | (2006.01) |
| C09K 8/36 | (2006.01) |
| C09K 8/502 | (2006.01) |
| C09K 8/506 | (2006.01) |
| C09K 8/508 | (2006.01) |
| C09K 8/512 | (2006.01) |
| C09K 8/516 | (2006.01) |
| C09K 8/56 | (2006.01) |
| C09K 8/565 | (2006.01) |
| E21B 21/00 | (2006.01) |
| C09K 8/03 | (2006.01) |
| C09K 8/035 | (2006.01) |

(52) U.S. Cl.
CPC ........... *E21B 33/138* (2013.01); *C09K 8/032* (2013.01); *C09K 8/035* (2013.01); *C09K 8/32* (2013.01); *C09K 8/36* (2013.01); *C09K 8/502* (2013.01); *C09K 8/506* (2013.01); *C09K 8/508* (2013.01); *C09K 8/512* (2013.01); *C09K 8/516* (2013.01); *C09K 8/56* (2013.01); *C09K 8/565* (2013.01); *E21B 21/003* (2013.01); *E21B 33/13* (2013.01)

(58) Field of Classification Search
None
See application file for complete search history.

(56) References Cited

U.S. PATENT DOCUMENTS

| | | | |
|---|---|---|---|
| 3,493,406 A | 2/1979 | Fillet et al. | |
| 4,152,941 A | 5/1979 | Abou-Sayed et al. | |
| 4,460,882 A * | 7/1984 | Heinrich | H01F 7/0221 335/225 |
| 4,473,480 A | 9/1984 | Green et al. | |
| 4,732,213 A | 3/1988 | Bennett et al. | |
| 4,760,882 A | 8/1988 | Novak | |
| 4,799,549 A | 1/1989 | Vinot et al. | |
| 4,891,072 A | 1/1990 | Cooper | |
| 5,209,297 A | 5/1993 | Ott | |
| 5,213,160 A | 5/1993 | Nahm et al. | |
| 5,495,891 A * | 3/1996 | Sydansk | C09K 8/38 166/295 |
| 5,495,903 A | 3/1996 | Griffin et al. | |
| 6,059,036 A | 5/2000 | Chatterji et al. | |
| 6,312,741 B1 | 11/2001 | Navarro | |
| 6,613,720 B1 | 9/2003 | Feraud et al. | |
| 6,976,537 B1 | 12/2005 | Verret | |
| 7,226,895 B2 | 6/2007 | Xiang | |
| 7,740,068 B2 | 6/2010 | Ballard | |
| 7,833,945 B2 | 11/2010 | Harrower et al. | |
| 7,926,567 B2 | 4/2011 | Harris et al. | |
| 8,272,440 B2 | 9/2012 | Dalrymple et al. | |
| 8,383,558 B2 | 2/2013 | Reddy et al. | |
| 8,455,404 B2 | 6/2013 | Harrower et al. | |
| 8,474,532 B2 | 7/2013 | Ballard | |
| 8,494,827 B2 | 7/2013 | Mutlu et al. | |
| 8,700,628 B1 | 4/2014 | Korn et al. | |
| 9,701,887 B2 | 7/2017 | Mutlu et al. | |

(Continued)

OTHER PUBLICATIONS

De Loos et al., Tripodal Tris-Urea Derivatives as Gelators for Organic Solvents, Eur. J. Org. Chem., 22, 3675-3678, 2000 (Year: 2000).*

International Search Report and Written Opinion regarding corresponding application No. PCT/US2015/023274; dated Jun. 23, 2015; 8 pages.

International Search Report and Written Opinion for the cross referenced International patent application PCT/US2015/023253 dated Jun. 22, 2015.

International Search Report and Written Opinion for the cross referenced International patent application PCT/US2015/023254 dated Jun. 23, 2015.

(Continued)

*Primary Examiner* — Charles R Nold

(57) ABSTRACT

A method of sealing a formation that includes drilling a wellbore through the formation while pumping a non-aqueous based wellbore fluid comprising a first sealing component into the wellbore, wherein the non-aqueous based wellbore fluid filters into the formation as a filtrate and substantially thickens is disclosed. The substantially thickening may result from adding a second sealing component to the wellbore fluid, whereby the first sealing component initiates a reaction of the second sealing component.

10 Claims, No Drawings

(56) References Cited

U.S. PATENT DOCUMENTS

| | | |
|---|---|---|
| 2003/0236171 A1 | 12/2003 | Nguyen et al. |
| 2004/0129456 A1* | 7/2004 | Vail, III ................. E21B 7/065 175/57 |
| 2005/0000734 A1 | 1/2005 | Getzlaf et al. |
| 2006/0079408 A1 | 4/2006 | Verret |
| 2006/0157248 A1 | 7/2006 | Hoefer et al. |
| 2006/0213662 A1 | 9/2006 | Creel et al. |
| 2007/0034410 A1 | 2/2007 | Xiang |
| 2007/0089909 A1 | 4/2007 | Freeman |
| 2007/0137852 A1* | 6/2007 | Considine ........... E21B 43/2401 166/60 |
| 2007/0169936 A1 | 7/2007 | Zusaltz et al. |
| 2007/0244013 A1 | 10/2007 | Hoskins |
| 2007/0294034 A1 | 12/2007 | Bratton et al. |
| 2008/0125334 A1 | 5/2008 | Burns et al. |
| 2008/0264637 A1 | 10/2008 | Burts et al. |
| 2008/0283242 A1 | 11/2008 | Ekstrand et al. |
| 2008/0296023 A1* | 12/2008 | Willauer ................. C08K 3/08 166/302 |
| 2009/0151938 A1 | 6/2009 | Conkle et al. |
| 2009/0258798 A1 | 10/2009 | Munoz et al. |
| 2010/0088078 A1 | 4/2010 | Geehan et al. |
| 2010/0193244 A1* | 8/2010 | Hoskins ................. C09K 8/035 175/5 |
| 2010/0210486 A1* | 8/2010 | Horton ................... C09K 8/512 507/224 |
| 2010/0243236 A1 | 9/2010 | Koons |
| 2010/0258313 A1 | 10/2010 | Ballard |
| 2011/0056683 A1 | 3/2011 | Duncum et al. |
| 2011/0112211 A1* | 5/2011 | Audibert ............. C04B 20/1055 523/130 |
| 2011/0139454 A1 | 6/2011 | Shindgikar et al. |
| 2011/0214862 A1 | 9/2011 | Horton et al. |
| 2012/0000652 A1* | 1/2012 | Jones ..................... C09K 8/035 166/278 |
| 2012/0216990 A1 | 3/2012 | Quintero et al. |
| 2013/0133888 A1 | 5/2013 | Ballard |
| 2013/0213838 A1 | 8/2013 | Keller et al. |
| 2013/0233623 A1 | 9/2013 | Aston et al. |
| 2014/0290954 A1 | 10/2014 | Mettath |
| 2014/0305646 A1 | 10/2014 | Chew et al. |
| 2014/0352967 A1 | 12/2014 | Burns et al. |
| 2015/0168597 A1 | 6/2015 | Bai |
| 2015/0315894 A1 | 11/2015 | Guo |
| 2017/0015887 A1 | 1/2017 | De Stefano et al. |
| 2017/0029688 A1 | 2/2017 | De Stefano et al. |

OTHER PUBLICATIONS

International Preliminary Report on Patentability for the cross referenced International patent application PCT/US2015/023253 dated Oct. 13, 2016.

International Preliminary Report on Patentability for the cross referenced International patent application PCT/US2015/023254 dated Oct. 13, 2016.

Office Action for the cross referenced U.S. Appl. No. 14/675,234 dated Sep. 21, 2017.

Office Action for the cross referenced U.S. Appl. No. 15/300,801 dated Dec. 14, 2017.

Office Action for the cross referenced U.S. Appl. No. 15/300,803 dated Jan. 12, 2018.

Office Action for the cross referenced U.S. Appl. No. 14/675,234 dated Jul. 11, 2018.

Office Action for the counterpart Brazilian patent application dated Dec. 30, 2019.

Office Action for the equivalent Mexican patent application MX/a/2016/012795 dated Oct. 2, 2019.

Office Action 30425 issued in counterpart Mexiccan patent application MX/a/2016/012795 dated Jul. 13, 2020, English Tranalstion, 6, pages.

Preliminary Office Action issued in Brazilian Patent Application 1120160226976 dated Dec. 30, 2019, 4 pages.

Examination Report under Section 18(3) issued in Great Britain patent application 1617841.0 dated Mar. 18, 2020, 4 pages.

Office Action 23421 issued in Mexican patent application MXa/2016/012795 dated Mar. 12, 2021, 12 pages.

Examination report under Section 18(3) issued in Great Britain patent application 1617837.8 dated Jan. 14, 2021, 4 pages.

* cited by examiner

SMART FILTRATE FOR STRENGTHENING FORMATIONS

RELATED APPLICATION

This application is a National Stage application of International Application No. PCT/US2015/023274 filed Mar. 30, 2015, which claims priority to and the benefit of U.S. Provisional Patent Application having Ser. No. 61/972,871, filed 31 Mar. 2014; U.S. Provisional Patent Application having Ser. No. 61/972,755, filed 31 Mar. 2014; and U.S. Provisional Patent Application having Ser. No. 61/972,805, filed 31 Mar. 2014, which are all incorporated by reference in their entirety.

BACKGROUND

During the drilling or completion of an oil and gas well, the walls of oil and gas formations are often exposed to wellbore fluids which may damage producing formations. To prevent such damage, a wellbore often requires the deposit of a low-permeability filtercake on the walls of the wellbore to seal the permeable formation exposed by the drilling operation. The filtercake functions to limit drilling fluid losses from the wellbore as well as protect the formation from possible damage by the fluids filtering into the walls of the wellbore. Solids, such as particulate fines, suspended in the drilling fluid may also contribute to damaging hydrocarbon producing formations.

To protect formations from damaging fluids and solids, a filtercake may be formed and/or deposited on the surface of the subterranean formation. Filtercakes are typically formed when particles suspended in a wellbore fluid coat and plug the pores in the subterranean formation such that the filtercake prevents or reduces both the loss of fluids into the formation and the influx of fluids present in the formation. A number of ways of forming filtercakes are known in the art, including the use of bridging particles, cuttings created by the drilling process, polymeric additives, and precipitates.

SUMMARY

In one aspect, embodiments disclosed herein relate to a method of sealing a formation that includes drilling a wellbore through the formation while pumping a non-aqueous based wellbore fluid comprising a first sealing component into the wellbore, the non-aqueous based wellbore fluid filters into the formation as a filtrate and substantially thickens.

In another aspect, embodiments disclosed herein relate to compositions including a non-aqueous base fluid and an encapsulated sealing component comprising a sealing component encapsulated by an encapsulant, wherein the sealing component is selected from the group consisting of peroxide, modified persulfate, metallocene, dispersed silicon carbide, or dispersed carbonaceous material chosen from the group including: graphite, graphene, graphene oxide, glassy carbon, carbon nanofoam, buckminsterfullerene, buckypaper, nanofiber, nanoplatelets, nano-onions, nanoribbons, nanohorns, single- or multi-walled carbon nanotubes, carbon black, carbon nanotubes, and combinations thereof.

In another aspect, embodiments disclosed herein relate to a filtrate including a base fluid, a first sealing component comprising a thixotropic fluid, and a second sealing component.

Other aspects and advantages of the claimed subject matter will be apparent from the following description and the appended claims.

DETAILED DESCRIPTION

Generally, embodiments disclosed herein relate to methods for chemically sealing the near-wellbore region within a formation containing a filtrate. More specifically, embodiments disclosed herein utilize a fluid that filters into a formation to form a filtercake on the walls of the wellbore, with the filtrate filtering a depth into the formation. One or more embodiments of such fluid filtrate may include a non-aqueous based wellbore fluid and a multi-component system for the selective reaction of the components within the filtrate to affect the formation of a chemical seal within the near-wellbore formation region containing the filtrate while drilling in a wellbore. One or more other embodiments of such fluid filtrate may include a non-aqueous based wellbore fluid and a thixotropic component that may be liquid under moving conditions, but solid in static conditions, such as in the near-wellbore region of the formation.

Embodiments of the present disclosure may be particularly suitable for drilling through depleted sandstone formations, as well as other depleted formation types. Depleted formations pose numerous technical challenges, including wellbore instability, severe lost circulation, etc., which generally make further development uneconomical. Uncontrollable drilling fluid losses frequently are unavoidable in the often large fracture characteristics of these formations. While conventional wellbore strengthening techniques often involve the use of particulates to create a hoop stress and thus increase the strength of the formation through formation of a stress cage, such techniques involve the formation of new fractures, which may be undesirable for a depleted formation. Thus, embodiments of the present disclosure seek to strengthen the formation through the formation of a chemical sealing layer in the near-wellbore formation region containing the filtrate. Thus, the embodiments may be distinguished from conventional methods strengthening a wellbore in that the chemical sealing layer provides greater strength and stability to the near-wellbore formation region containing the filtrate as compared to the filter cake provided by the components of the drilling fluid from simple drilling fluid leak-off.

Conventionally, a filter cake including polymeric and solid components is used within a wellbore to bridge pore throats and/or provide filtration reduction, however, the present embodiments are directed to providing components within the filtrate in which a chemical reaction, such as polymerization or crosslinking, or viscosity change occurs in situ to change the chemical nature of the near-wellbore formation region containing the filtrate. Further, in one or more embodiments, in situ refers to simultaneous with or following the filtration of the drilling fluid into the drilled formation. The chemical reaction of the fluid components may be selectively activated to prevent or at least reduce premature reaction within the drill string and also achieve reaction in the near-bit area, when desired. Thus, to achieve such selective activation, in one or more embodiments multiple components may be incorporated into the wellbore fluid(s). To avoid or reduce premature reaction, one of the components may be encapsulated or otherwise rendered chemically non-reactive. Upon activation and exposure to a second sealing component, with which the first sealing component is reactive, the two (or more) components may react and change the chemical nature of the formation region containing the filtrate and form a chemical sealing layer behind the filter cake.

In one or more embodiments, a first sealing component is included in a non-aqueous wellbore fluid. The first sealing component may filter into the formation with the fluid filtrate during the drilling process and formation of a filter cake on the walls of the wellbore. In one embodiment, the first sealing component is a thixotropic component that transitions from liquid to substantially solid upon reducing movement (once filtered into the formation), thereby forming a sealing layer in the formation behind the filter cake. In other embodiments, the first sealing component acts in conjunction with a second sealing component which may be encapsulated or otherwise inactive and subsequently activated such that the first and second sealing components will react to form a chemical sealing layer behind the filter cake. As mentioned, a second sealing component may optionally be used to trigger reaction with the first sealing component to form a chemical sealing layer. The second sealing component may be optionally encapsulated within a material composition that effectively limits the interaction of the first sealing component with the other components of the non-aqueous based wellbore fluid or be otherwise inactivated. While encapsulated, the second sealing component remains dormant; however, as will be discussed in more detail below, the material composition making up the encapsulant may be engineered to release the second sealing component within the filtrate. Further, in some embodiments the second sealing component may be incorporated with the fluid in which the first sealing component is pumped or may be subsequently pumped into the wellbore, such as upon experience of drill fluid losses, or when an operator otherwise deems it necessary to affect the formation of a chemical sealing layer in the currently drilled region of the formation. For example, the addition of the second sealing component to the circulating wellbore fluid in an on-demand fashion may be beneficial if a fluid loss is registered via pressure change during drilling. Once fluid loss is registered, the second sealing component may be added and/or emulsified into the wellbore fluid and, once in combination with the first sealing component already present in the filtrate, affect the formation of a chemical sealing layer in the problematic portion of the freshly cut formation containing the filtrate. In one or more other embodiments, as a preventative measure against fluid loss the first and second sealing components may be directly combined together in the non-aqueous based wellbore fluid and used during the wellbore operation before a fluid loss event is registered.

In one or more embodiments, the second sealing component is encapsulated within a material composition to form encapsulated particles. In one embodiment, the encapsulating composition may be thick and strong enough not to break/fragment by the shear forces or the pressure drop at the bit upon its injection from the drill string along with the wellbore fluid. However in other embodiments, depending on the composition of the selected encapsulant, the release of the second sealing component may be based upon the shear forces generated at the bit. Such mechanisms may be used where the reaction between the first and second sealing components is sufficiently delayed that the fluid is able to filter into the formation as a filtrate before substantial levels of reaction have occurred. In still other embodiments, the encapsulant may release the second sealing component in response to an external stimulus or triggering event, which may include temperature, pH, enzymatic degradation, oxidants, solvents, or physical disruption, such as by grinding the encapsulant particles. It is also envisioned that encapsulants susceptible to triggered release may also be used in conjunction with passive diffusion encapsulants, and combined with any of the strategies disclosed above.

The shear forces generated by the passage of the wellbore fluid through a restriction, e.g. a perforation or a drill bit may be sufficient to release the encapsulated first sealing component. Without being bound by any theory, the inventors believe that the combination of shear and elongational flow experienced in these conditions may produce enough stress to break the encapsulant. Basically, the stress might first come from the turbulence experienced in the pumps of surface equipment and within the wellbore fluid itself; after that, the passage of the flow through a restriction creates first some sort of "Venturi effect" with an acceleration of the wellbore fluid which may have the effect of deforming the encapsulant and then at the outlet of the restriction another deformation of the encapsulant coming from the wellbore fluid deceleration. Velocity increases and decreases are of the order of 50 to 100 times variation. Strain rates experienced in restriction are from 1000 to one million reciprocal second, more specifically 10000 to 200000 reciprocal second. The inventors have noticed that even if the stress experienced during pumping and along the transportation has an effect on the breakage of the encapsulant, the stress and/or velocity difference which is obtained due to the flow through a restriction may be of paramount importance. The stress is closely related to the pressure drop encompassed in each unit of the well treatment (pumps, pipes, drill-bit). A higher pressure drop corresponds to a higher stress applied. The highest stress is observed when the fluid passes through the nozzles in a drill bit or a port of the completion string downhole. By stress sufficient to break the encapsulant, it is to be under stood in the context of the present disclosure that said sufficient stress is produced by the passage through the nozzles of the drill bit or similar restriction to allow the second sealing component to be released from the encapsulant. The pressure drop observed when passing through the nozzles is from about 150 to 5000 psi (10 to 345 bar), more specifically from 300 to 5000 psi (20 to 345 bar), most specifically from 300 to 1000 psi (20 to 69 bar). As shown earlier, the stress may sometimes also be referred to as a velocity difference.

In still other embodiments, the encapsulant may release the second sealing component in response to an external stimulus or triggering event, which may include temperature, pH, enzymatic degradation, oxidants, solvents, or physical disruption, such as by grinding the encapsulant particles. It is also envisioned that encapsulants susceptible to triggered release may also be used in conjunction with passive diffusion encapsulants, and combined with any of the strategies disclosed above.

The encapsulation material may be a heat-activated material that remains intact prior to exposure to elevated temperatures, such as those present in a downhole environment, and upon heating, slowly melt and release the molecules or ions contained within. In some embodiments, the coating may melt at a temperature greater than 125° F. (52° C.). Examples of such materials are vegetable fat, gelatin, and vegetable gums, and hydrogenated vegetable oil. Other coatings may include materials selected from lipid materials such as, but not limited to, mono-, di-, and tri-glycerides, waxes, and organic and esters derived from animals, vegetables, minerals, and modifications. Examples include glyceryl triestearates such as soybean oil, cottonseed oil, canola oil, carnuba wax, beeswax, bran wax, tallow, and palm kernel oil. Heat-activated materials may also include those disclosed in U.S. Pat. No. 6,312,741, which is incorporated herein by reference in its entirety.

In a particular embodiment, the encapsulating material may include enteric polymers, which are defined for the purposes of the present disclosure, as polymers whose solubility characteristics are pH dependent. Here, this means that salt release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the monovalent or polyvalent salt under predetermined conditions of pH, or a combination of pH and temperature. For example, the Glascol family of polymers are acrylic based polymers (available form Ciba Specialty Chemicals) are considered suitable enteric polymers for the present disclosure because the solubility depends upon the pH of the solution. In an illustrative embodiment of the present disclosure, an enteric polymer may be selected as an encapsulating material that is substantially insoluble at pH values greater than about 7.5 and that is more soluble under conditions of decreasing pH.

Encapsulating materials may also include enzymatically degradable polymers and polysaccharides such as galactomannan gums, glucans, guars, derivatized guars, starch, derivatized starch, hydroxyethyl cellulose, carboxymethyl cellulose, xanthan, cellulose, and cellulose derivatives. Enzymatically degradable polymers may include glycosidic linkages that are susceptible to degradation by natural polymer degrading enzymes, which may be selected from, for example, carbohydrases, amylases, pullulanases, and cellulases. In other embodiments, the enzyme may be selected from endo-amylase, exo-amylase, isoamylase, glucosidase, amylo-glucosidase, malto-hydrolase, maltosidase, isomalto-hydrolase or malto-hexaosidase. One skilled in the art would appreciate that selection of an enzyme may depend on various factors such as the type of polymeric additive used in the wellbore fluid being degraded, the temperature of the wellbore, and the pH of wellbore fluid.

Additionally, the mean diameter of each encapsulated particle should be large enough to assure that it may be effectively retained in the filter cake. In one or more embodiments, the particles formed by encapsulating the first sealing component have a mean diameter of greater than about 20 to 30 micron. However, in other embodiments, the mean diameter of each encapsulated particle may be less than about 20 micron so that the particles may pass through the filtercake and be retained in the filtrate contained in the near-wellbore region of the formation. In one or more embodiments, the material composition of the encapsulant comprises at least one dissolvable material, which may be a material that slowly dissolves in the non-aqueous based drilling fluid. In one or more embodiments, the dissolvable material is a high temperature wax such as carnauba wax or a polyalkyleneglycol such as polyethylene glycol. Carnauba wax is one of the hardest waxes, possessing a high melting point (~170° F.) and is substantially insoluble in water and most other solvents. However, under downhole conditions and in the presence of a non-aqueous wellbore fluid, over time carnauba wax may dissolve in the non-aqueous based wellbore fluid and release the second sealing component within the filtrate or in/near the filter cake.

In one or more embodiments, the first sealing component may be oligomers that are incorporated into the non-aqueous fluid either initially or upon the detection of a fluid loss event. In more specific embodiments, the first sealing component may be vinyl ester or polybutadiene oligomers, such as those described in U.S. patent application Ser. Nos. 61/436,339 and 61/498,305, which are herein incorporated by reference in their entirety. However, it is also intended that other oligomers may be used as the first sealing component instead of vinyl esters and polybutadienes. In such embodiments, the second sealing component may be a peroxide or other peroxide forming composition, which is optionally encapsulated. Upon its release from the encapsulant, or upon exposure of the peroxide with the vinyl ester or polybutadiene oligomer, the peroxide may be able to initiate a polymerization chain reaction between the oligomers present within the filtrate to form a chemical seal within the near-wellbore region of the formation, In yet another embodiment, the second sealing component may be a modified persulfate or a metallocene. In these instances, the modified persulfate may slowly release peroxide species that are capable of initiating a polymerization chain reaction between the oligomers present within the filtrate to form a chemical seal within the near-wellbore region of the formation. The use of a metallocene may also catalyze a polymerization reaction between the oligomers present within the filtrate to form a chemical seal within the formation.

In still other embodiments, polymerization of the oligomers of the first sealing component may be initiated by the action of a downhole tool. Specifically, in the absence of a second sealing component, the polymerization of the oligomers may be initiated by ultrasonication of the desired formation area. In this case, upon the incorporation of the oligomers into the filtrate a downhole tool capable of ultrasonication may be placed and/or, if already present on the drill string, activated within the wellbore in order to initiate the polymerization of the oligomers within the filtrate.

In another embodiment, a second sealing component comprising at least one of a dispersed silicon carbide or dispersed carbonaceous material chosen from the group including: graphite, graphene, graphene oxide, glassy carbon, carbon nanofoam, buckminsterfullerene, buckypaper, nanofiber, nanoplatelets, nano-onions, nanoribbons, nanohorns, single- or multi-walled carbon nanotubes, carbon black, carbon nanotubes, and derivatives thereof may be utilized as a sensitizer for a downhole tool. Silicon carbide and carbonaceous nanomaterials display strong absorption of a large range of electromagnetic radiation, including gamma, ultraviolet, microwave, and radio wave radiation, with subsequent light emission and heat release. While not adhering to any particular theory, carbon nanomaterials incorporated in the wellbore fluids of the present disclosure may exhibit dielectric loss, in which energy from incident radiation is transmitted as heat into the surrounding media, i.e. a wellbore fluid, filtrate, filtercake, polymer, gel, etc. In these instances, the second sealing component's sensitivity to electromagnetic radiation may be utilized to substantially and quickly increase the temperature within the filtrate in order to initiate a polymerization reaction between the oligomers, discussed above. Upon the incorporation of the first sealing components into the filtrate, and second sealing component into the filtrate or the near-bit region of the wellbore, a microwave or UV source may be placed and/or, if already present on the drill string, activated within the wellbore in order to increase the temperature within the filtrate and initiate the polymerization of the oligomers within the filtrate.

In still another embodiment, a first sealing component comprising additives with thixotropic properties, may be incorporated into the non-aqueous based wellbore fluid in order to create a seal within the region of the formation containing the filtrate. Suitable additives may include tris urea and derivatives thereof or any other oil soluble polymer possessing thixotropic properties. Thixotropy is a shear thinning property wherein certain fluids are thick and viscous under static conditions but also capable of thinning and flowing when agitated or otherwise stressed. Thus, upon the pumping action of the fluid during drilling the fluid with thixotropic additives will readily flow, but upon the leaking of the drilling fluid into the formation in the form of a filtrate the fluid will experience more restriction and less agitation within the pores of the formation thus rendering the filtrate thicker and more viscous. This thickening of the fluid within the pores may serve to effectively seal the region of the formation containing the thickened filtrate.

The non-aqueous based wellbore fluids may include, for example, an oleaginous continuous phase, a non-oleaginous discontinuous phase, first and second sealing components as indicated above, weighting agents, emulsifiers, viscosifiers, and/or other additives conventionally used in drilling fluids.

The oleaginous fluid may be a liquid and more specifically is a natural or synthetic oil and more specifically the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more specifically about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and specifically is an aqueous liquid. More specifically, the non-oleaginous liquid may be selected from the group including sea water, a brine containing organic and/or inorganic dissolved salts, liquids containing water-miscible organic compounds and combinations thereof. The amount of the non-oleaginous fluid is less than the theoretical limit needed for forming an invert emulsion. Thus in one embodiment the amount of non-oleaginous fluid is less that about 70% by volume, and more specifically from about 1% to about 70% by volume. In another embodiment, the non-oleaginous fluid is from about 5% to about 60% by volume of the invert emulsion fluid. The fluid phase may include either an aqueous fluid or an oleaginous fluid, or mixtures thereof.

Conventional methods can be used to prepare the drilling fluids disclosed herein, in a manner analogous to those normally used to prepare conventional oil-based drilling fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Emulsifiers that may be used in the fluids disclosed herein include, for example, an alkoxylated ether acid. In embodiment of an alkoxylated ether acid is an alkoxylated fatty alcohol terminated with an carboxylic acid, represented by the following formula:

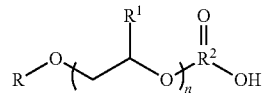

where R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 1 to 20. Such compound may be formed by the reaction of an alcohol with a polyether (such as poly(ethylene oxide), polypropylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —$CH_3$, n may range up to 20 (and up to 15 in other embodiments). Further, selection of R (or $R^3$) and $R^2$ may also depend on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these.

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications. Conventional suspending agents that may be used in the fluids disclosed herein include organophilic clays, amine treated clays, oil soluble polymers, polyamide resins, polycarboxylic acids, and soaps. The amount of conventional suspending agent used in the composition, if any, may vary depending upon the end use of the composition. However, normally about 0.1% to about 6% by weight is sufficient for most applications.

Weighting agents or density materials conventionally used in drilling fluids include galena, hematite, magnetite, iron oxides, illmenite, barite, siderite, celestite, dolomite, calcite, and the like. The quantity of such material added, if any, depends upon the desired density of the final composition. Weight material is added to result in a drilling fluid density of up to about 24 pounds per gallon, but a lower density may be particularly desired for drilling through depleted reservoirs, for example up to 16 ppg.

Gelling materials that may be used in the drilling fluids disclosed herein include bentonite, sepiolite, clay, attapulgite clay, anionic high-molecular weight polymer and biopolymers.

In various embodiments, methods of drilling a subterranean hole may include mixing an oleaginous fluid, a non-oleaginous fluid, an emulsifier, such as those described above, with an inactivated first sealing component and optionally a second sealing component; and drilling the subterranean hole using this fluid as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling, and may be particularly suitable for drilling through depleted reservoirs, especially depleted sandstone formations. The first sealing component and second sealing component may be provided together in the drilling fluid as a preventative measure to react in situ to form a chemical sealing layer in the region of the formation containing the filtrate within a wellbore drilled through a depleted reservoir. In one or more other embodiments, one of the components may be provided as a background, and the second sealing component may be added once losses are registered, to react with the first sealing component (now in the filtrate) to form a chemical sealing layer within the region of formation containing the filtrate as a remediative measure.

Embodiments of the present disclosure may provide at least one of the following advantages. The systems disclosed may be particularly suitable for drilling through depleted sandstone formations, as well as other depleted formation types, which present numerous technical challenges. By adding the second sealing component once fluid losses are registered, the chemical seal formed by the reaction of the first and second sealing component may be highly localized and selectively formed directly within the loss zone. This results in both material savings from the limited use of a second sealing component and time savings as it allows for selectively treating the formation while drilling, without having to trip out the drill string to treat the loss zone.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of sealing a formation, comprising: drilling a wellbore through the formation while pumping a non-aqueous based wellbore fluid comprising a first sealing component into the wellbore;
   wherein the first sealing component comprises a vinyl ester oligomer or a polybutadiene oligomer; and
   adding a second sealing component to the wellbore fluid, wherein the second sealing, component is encapsulated by an encapsulant,
   wherein the non-aqueous based wellbore fluid and the second sealing component filter into the formation as a filtrate and thicken during the drilling; and
   forming a chemical sealing, layer in a near-wellbore formation region of the formation
   wherein the first sealing component and the second sealing component react to form the chemical sealing layer during the drilling,
   wherein the second sealing component is at least one of: metallocene; dispersed silicon carbide; and dispersed carbonaceous material selected from the group consisting of: graphite; graphene; graphene oxide; glassy carbon; carbon nanofoam; buckminsterfullerene; buckypaper; nanofiber; nanoplatelets; nano-onions; nanoribbons; nanohorns; single- or multi-walled carbon nanotubes; carbon black; carbon nanotubes; and combinations thereof.

2. The method of claim 1, wherein the encapsulant releases the second sealing component within the near-wellbore formation region.

3. The method of claim 2, wherein the encapsulant is a composition comprising a dissolvable component.

4. The method of claim 2, wherein the encapsulant is an enteric polymer.

5. The method of claim 2, wherein the second sealing component comprises encapsulated particles having mean diameters greater than 20 microns.

6. The method of claim 2, wherein the second. sealing component comprises encapsulated particles having mean diameters less than 20 microns.

7. The method of claim 1, further comprising: initiating polymerization of at least one of the vinyl ester oligomer and the polybutadiene oligomer.

8. The method of claim 1, further comprising: registering at least one fluid loss during the drilling; and
   pumping the second sealing component into the wellbore in response to the at least one fluid loss registered during the drilling.

9. The method of claim 1, further comprising: activating a microwave source, ultraviolet source or an ultrasonification source within the wellbore.

10. The method of claim 1, wherein the chemical sealing layer is formed in the formation behind a filter cake formed on walls of the wellbore.

* * * * *